W. A. HART.
PLOW.
APPLICATION FILED JULY 3, 1914.
1,126,632.
Patented Jan. 26, 1915.
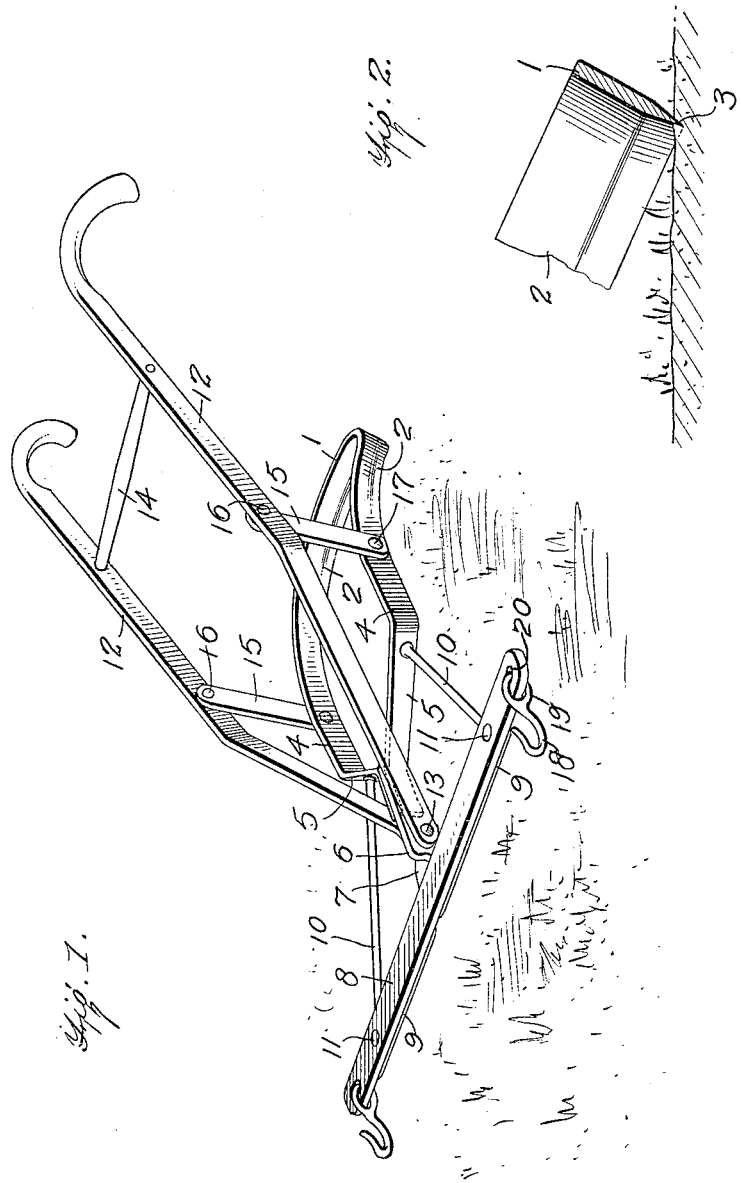
WITNESSES
INVENTOR
WILLIS A. HART,
BY
ATTORNEYS

UNITED STATES PATENT OFFICE.

WILLIS A. HART, OF COCOA, FLORIDA.

PLOW.

1,126,632.

Specification of Letters Patent. Patented Jan. 26, 1915.

Application filed July 3, 1914. Serial No. 848,739.

*To all whom it may concern:*

Be it known that I, WILLIS A. HART, a citizen of the United States, and a resident of Cocoa, in the county of Brevard and State of Florida, have invented a new and useful Improvement in Plows, of which the following is a specification.

My invention is an improvement in plows, and has for its object to provide a device of the character specified, especially designed for cutting plants beneath the surface of the ground, in order to destroy the plants without disturbing the ground to any great extent, and wherein the device is also adapted for ordinary purposes of cultivation.

In the drawings:—Figure 1 is a perspective view of the improved plow, and Fig. 2 is a detail sectional view of the point or cutter.

The present embodiment of the invention comprises a cutting blade of arc-shape, consisting of a body 1 and arms 2. The body and arms are continuous, joining each other on curved lines so that there is no abrupt bend between the body and the arms, and the free edge of the body and the arms is beveled as indicated at 3 to form a cutting edge.

The arms are arc-shaped or curved in the plane of their width, and they extend upwardly and forwardly from the body, and thence forwardly as indicated at 4 in approximate parallelism. The arms are then bent inwardly toward each other as indicated at 5, and lapped along the sides of the rear end of the beam 6 and secured thereto in any desired or suitable manner.

The front end of the beam is given a quarter turn as shown at 7, to lie flat against the under side of a plate 8, which extends transversely of the beam, and the beam has a lateral extension 9 at each side, each of the extensions lying along the under side of the plate 8, and extending to near its outer end as shown. Brace rods 10 are connected with the portions 5 of the arms of the plow at one end, and at the other end each of the said rods is provided with a lateral lug 11, which passes upwardly through registering openings in the adjacent extension 9 and the adjacent end of the plate 8, and each lug is headed to prevent disengagement thereof above the plate. At their rear ends the rods 10 are passed through openings in the inclined portions of the arms, and are headed or otherwise arranged to prevent withdrawal.

Handles 12 are connected with the beam at the front end thereof, the handles being arranged on opposite sides of the beam and secured thereto by a rivet or bolt 13, and the handles are connected by a rung near their free ends. Each handle is braced against the adjacent arm 2 by means of a vertical strut or brace 15, each brace or strut being secured to the beam at one end by a rivet or bolt 16, and to the arm at the other end by a similar rivet or bolt 17.

Hooks 18 are engaged with the ends of the plate 8, each hook having an eye 19 which engages an opening 20 in the plate. The hooks 18 are for engagement by draft apparatus, and the plate 8 is in fact a doubletree or a swingle-tree, as may be desired.

It will be noted from an inspection of Figs. 1 and 2, that the cutter proper, namely, the body 1 and that portion of the arms 2, immediately adjacent to the body, is inclined to the surface of the ground in such manner that a furrow will be cut having a rounding bottom, and the soil will pass upwardly over the body to fall again into the furrow on the rear side of the plow proper.

The improved plow is especially designed for cutting plants beneath the surface of the ground without disturbing the soil to any great extent. The improved plow is especially designed for grubbing palmetto roots.

I claim:—

1. A plow comprising a cutter of U-shape and consisting of an arc-shaped body and arms integral with the body and gradually merging into the body, the forward edge of the body and arms being beveled to form a cutting edge, the arms being curved in the plane of their widest dimensions and having their convex edge upward, said arms being extended forwardly and inwardly, a beam, the front ends of the arms being lapped upon opposite sides of the rear end of the beam and secured thereto, handles connected with the beam near the front end thereof, each handle being braced against the adjacent arm of the cutter, a plate arranged transversely of the beam at the front end thereof, said beam having lateral extensions extending in opposite directions and underlying the plate at opposite sides of the beam, and brace rods extending between each end of the plate and the inwardly inclined portion of the adjacent arm, each end of the plate having an opening, and a hook engaging each opening.

2. A plow comprising a cutter of substantially U-shape and consisting of a body and arms, the arms inclining forwardly and upwardly, the forward edge of the body and the arms being beveled to form a cutting edge, and the arms being curved in the plane of their widest dimension and having their convex edges upward, a beam, the front ends of the arms being bent inward to lie upon opposite sides of the beam and being secured thereto, handles connected with the beam near the front end thereof, each handle being braced against the adjacent arm of the cutter, a draft plate arranged transversely of the beam at the front end thereof, the beam having lateral extensions underlying the plate at opposite sides of the beam, and brace rods between the ends of the plate and the cutter.

WILLIS A. HART.

Witnesses:
B. D. JERNEGAN,
G. E. HENDRY.

Copies of this patent may be obtained for five cents each, by addressing the "Commissioner of Patents, Washington, D. C."